(12) United States Patent
Kral et al.

(10) Patent No.: US 9,118,178 B2
(45) Date of Patent: Aug. 25, 2015

(54) TRACTION MOTOR DRIVE SYSTEM FOR A LOCOMOTIVE

(71) Applicant: Progress Rail Services Corp., Albertville, AL (US)

(72) Inventors: John Franklin Kral, Plainfield, IL (US); Sidarta Fornari Beltramin, Curitiba (BR)

(73) Assignee: Progress Rail Services Corporation, Albertville, AL (US)

( * ) Notice: Subject to any disclaimer, the term of this patent is extended or adjusted under 35 U.S.C. 154(b) by 0 days.

(21) Appl. No.: 14/269,427

(22) Filed: May 5, 2014

(65) Prior Publication Data
US 2014/0240874 A1    Aug. 28, 2014

Related U.S. Application Data

(62) Division of application No. 13/330,351, filed on Dec. 19, 2011, now Pat. No. 8,823,293.

(51) Int. Cl.
| | |
|---|---|
| H02P 5/46 | (2006.01) |
| H02H 7/08 | (2006.01) |
| B60L 3/00 | (2006.01) |
| H02P 5/68 | (2006.01) |
| H02P 5/685 | (2006.01) |
| B60L 7/04 | (2006.01) |
| B60L 7/12 | (2006.01) |
| B60L 7/22 | (2006.01) |

(52) U.S. Cl.
CPC ............ *H02H 7/0811* (2013.01); *B60L 3/0061* (2013.01); *B60L 3/0069* (2013.01); *B60L 7/04* (2013.01); *B60L 7/12* (2013.01); *B60L 7/22* (2013.01); *H02P 5/68* (2013.01); *H02P 5/685* (2013.01); *B60L 2200/26* (2013.01); *Y02T 10/642* (2013.01)

(58) Field of Classification Search
CPC ............. H02P 5/68; H02P 5/74; H02P 7/281; H02P 7/298; B60L 15/04; Y02T 10/646; Y02T 10/70; Y02T 10/7005
See application file for complete search history.

(56) References Cited

U.S. PATENT DOCUMENTS

| | | | |
|---|---|---|---|
| 4,008,423 A | 2/1977 | Christianson et al. | |
| 4,195,254 A | 3/1980 | Gurwicz et al. | |

(Continued)

FOREIGN PATENT DOCUMENTS

GB    2137035    9/1984

*Primary Examiner* — Shawki S Ismail
*Assistant Examiner* — Zooheb Imtiaz
(74) *Attorney, Agent, or Firm* — Finnegan, Henderson, Farabow, Garrett & Dunner, L.L.P.

(57) ABSTRACT

A traction motor drive system may include a plurality of armatures arranged in parallel with each other. The traction motor drive system may also include a plurality of field circuits arranged in series with one another, where each field circuit is associated with a respective one of the armatures. The plurality of field circuits may be arranged in parallel with the plurality of armatures. The traction motor drive system may also include a field isolation system. The field isolation system may include a shunt circuit associated with at least one of the field circuits. The shunt circuit may have a first and second shunt terminal. The field isolation system may also include a first field switch arranged in series with the plurality of field circuits. The first field switch may be configured to switch between the first shunt terminal of the shunt circuit and a first field terminal of at least one of the field circuits. The field system may also include a second field switch, arranged in series with the plurality of field circuits. The second field switch may be configured to switch between the second shunt terminal of the shunt circuit and a second field terminal of at least one of the field circuits.

5 Claims, 4 Drawing Sheets

(56) References Cited

U.S. PATENT DOCUMENTS

| | | |
|---|---|---|
| 5,245,495 A | 9/1993 | Bailey et al. |
| 5,528,445 A | 6/1996 | Cooke et al. |
| 6,497,182 B2 | 12/2002 | Melpolder et al. |
| 7,334,202 B1 | 2/2008 | Singh et al. |
| 2006/0076171 A1* | 4/2006 | Donnelly et al. ............ 180/65.2 |
| 2006/0255656 A1 | 11/2006 | Linebach et al. |
| 2008/0290825 A1* | 11/2008 | St-Jacques et al. ........... 318/380 |
| 2009/0295315 A1* | 12/2009 | Tarnow et al. ................ 318/380 |
| 2013/0062891 A1* | 3/2013 | Bourbeau ................... 290/38 C |
| 2013/0152817 A1* | 6/2013 | Kral et al. ....................... 105/54 |

\* cited by examiner

TRACTION MOTOR DRIVE SYSTEM FOR A LOCOMOTIVE

This is a divisional of application Ser. No. 13/330,351 filed on Dec. 19, 2011, which is incorporated herein by reference.

TECHNICAL FIELD

The present disclosure relates generally to traction motor drive systems and, more particularly, to systems and methods for isolating DC traction motor components on a locomotive.

BACKGROUND

Traction motors are commonly used in electrically powered rail vehicles such as diesel electric locomotives. Many locomotives today employ a plurality of DC traction motors, typically four or six, to provide sufficient towing power for hauling large payloads over long distances. In some cases, motors are connected in series or parallel, so that they can operate from a common electrical bus, simplifying wiring and electric control of the motors.

In some traction motor systems, the traction motors are hardwired in parallel and/or series with at least three to five other motors. Although this arrangement allows for the motors to share a common electrical bus, it may be susceptible to large scale drive system failure. In these arrangements, a failure of one of the motors in the same circuit may render all motors inoperable. For example, for motors connected in parallel, an electric failure that leads to a short circuit condition in one of the motors may disable all of the other traction motors in the circuit. In such a case, if all of the traction motors for the locomotive reside on the same circuit, the locomotive may lose all driving capability. Thus, to prevent a situation in which the loss of one motor disables the entire locomotive, a system for selectively isolating drive components that experience electrical failures may be required.

One solution for maintaining the traction motor system functionality in the event of a traction motor component failure is described in U.S. Pat. No. 6,497,182 B2 ("the '182 patent"). The '182 patent is directed to a system that purportedly incorporates a brake motor isolation switch disposed in signal communication with at least one of the traction motors for electrically isolating a faulting motor from the other traction motors.

The motor isolation solution provided by the system disclosed in the '182 patent is limited to traction motors in which the armature and the field winding circuit of the motor are connected in series. As a result, any failure that results in tripping of the isolation switch effectively removes both the armature and the corresponding field coil of the motor from the circuit. In certain situations, however, it may be advantageous to retain the ability to selectively remove only the failed component of the motor, rather than the entire motor. For example, in situations where a field winding of the motor has failed, it may be advantageous to allow the armature to remain in the circuit so that the dynamic braking capabilities of the armature are retained. While the '182 patent allows for a traction motor system to isolate a failed motor and to retain the functionality of the remaining motors, it may unnecessarily remove properly functioning components from the system—components that may otherwise contribute to the functionality of the drive system.

The presently disclosed traction motor drive system is directed to overcoming one or more of the problems set forth above and/or other problems in the art.

SUMMARY OF THE INVENTION

In accordance with one aspect, the present disclosure is directed to a traction motor drive system. The traction motor drive system may include a plurality of armatures arranged in parallel with one another. The traction motor drive system may also include a plurality of field circuits arranged in series with one another, each field circuit associated with a respective one of the armatures. The plurality of field circuits may be arranged in parallel with the plurality of armatures. The traction motor drive system may also include a field isolation system. The field isolation system may include a shunt circuit associated with at least one of the field circuits. The shunt circuit may have a first and second shunt terminal. The field isolation system may also include a first field switch arranged in series with the plurality of field circuits. The first field switch may be configured to switch between the first shunt terminal of the shunt circuit and a first field terminal of at least one of the field circuits. The field isolation system may also include a second field switch, arranged in series with the plurality of field circuits. The second field switch may be configured to switch between the second shunt terminal of the shunt circuit and a second field terminal of at least one of the field circuits.

In accordance with another aspect, the present disclosure is directed to a method for selectively isolating fault conditions on a traction motor drive system. The method may include detecting a fault condition associated with at least one of a plurality of traction motors of the traction motor drive system and identifying a field circuit from among a plurality of series-connected field circuits that corresponds to the traction motor affected by the fault condition. The method may also include identifying a plurality of field switches for isolating the field circuit from the remainder of the series-connected field circuits. The method may include generating a control signal for operating the identified plurality of field switches. The control signal may be configured to cause a first field switch arranged in series with the plurality of series-connected field circuits to switch from a first field terminal of the identified field circuit to a first shunt terminal of a shunt circuit associated with the field circuit. The control signal may also be configured to cause a second field switch arranged in series with the plurality of field circuits to switch from a second field terminal of the identified field circuit to a second shunt terminal of the shunt circuit.

According to another aspect, the present disclosure is directed to a locomotive. The locomotive may include a plurality of axles and a plurality of pairs of wheels, each pair of wheels attached to one of the axles. The locomotive may also include a plurality of armatures arranged in parallel with each other, each rotatably coupled to one of the axles. The locomotive may also include a plurality of field circuits arranged in series with one another, each field circuit associated with a respective one of the armatures. The plurality of field circuits may be arranged in parallel with the plurality of armatures. The locomotive may also include a field isolation system. The field isolation system of the locomotive may include a shunt circuit associated with at least one of the field circuits and comprising first and second shunt terminals. The field isolation system may also include a first field switch arranged in series with the plurality of field circuits. The first field switch may be configured to switch between the first shunt terminal of the shunt circuit and a first field terminal of at least one of the field circuits. The field isolation system may also include a second field switch arranged in series with the plurality of field circuits. The second field switch may be configured to switch between the second shunt terminal of the shunt circuit and the second field terminal of at least one of the field circuits.

DETAILED DESCRIPTION

Figure 1:
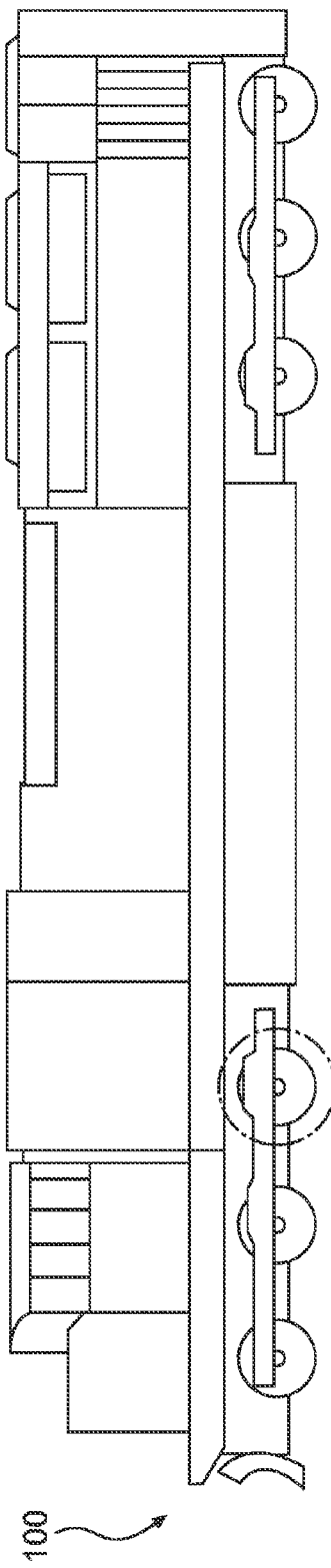
FIG. 1 illustrates an exemplary locomotive that comprises a traction motor.
Figure 1:
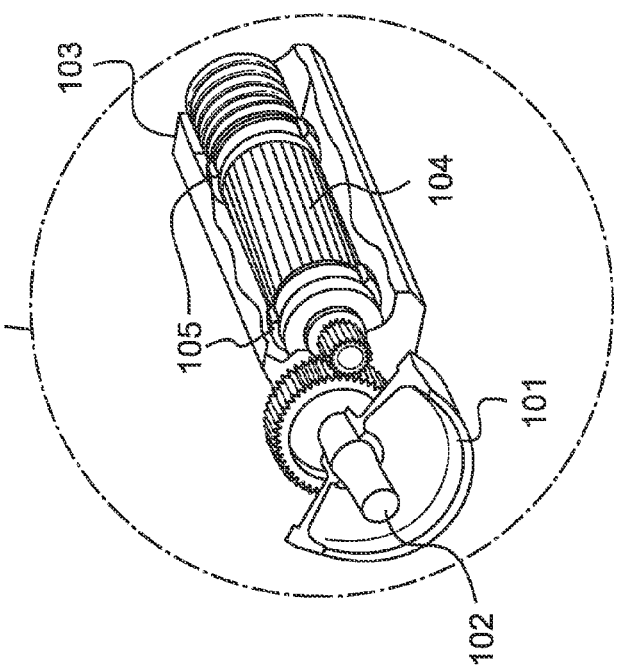
Figure 2:
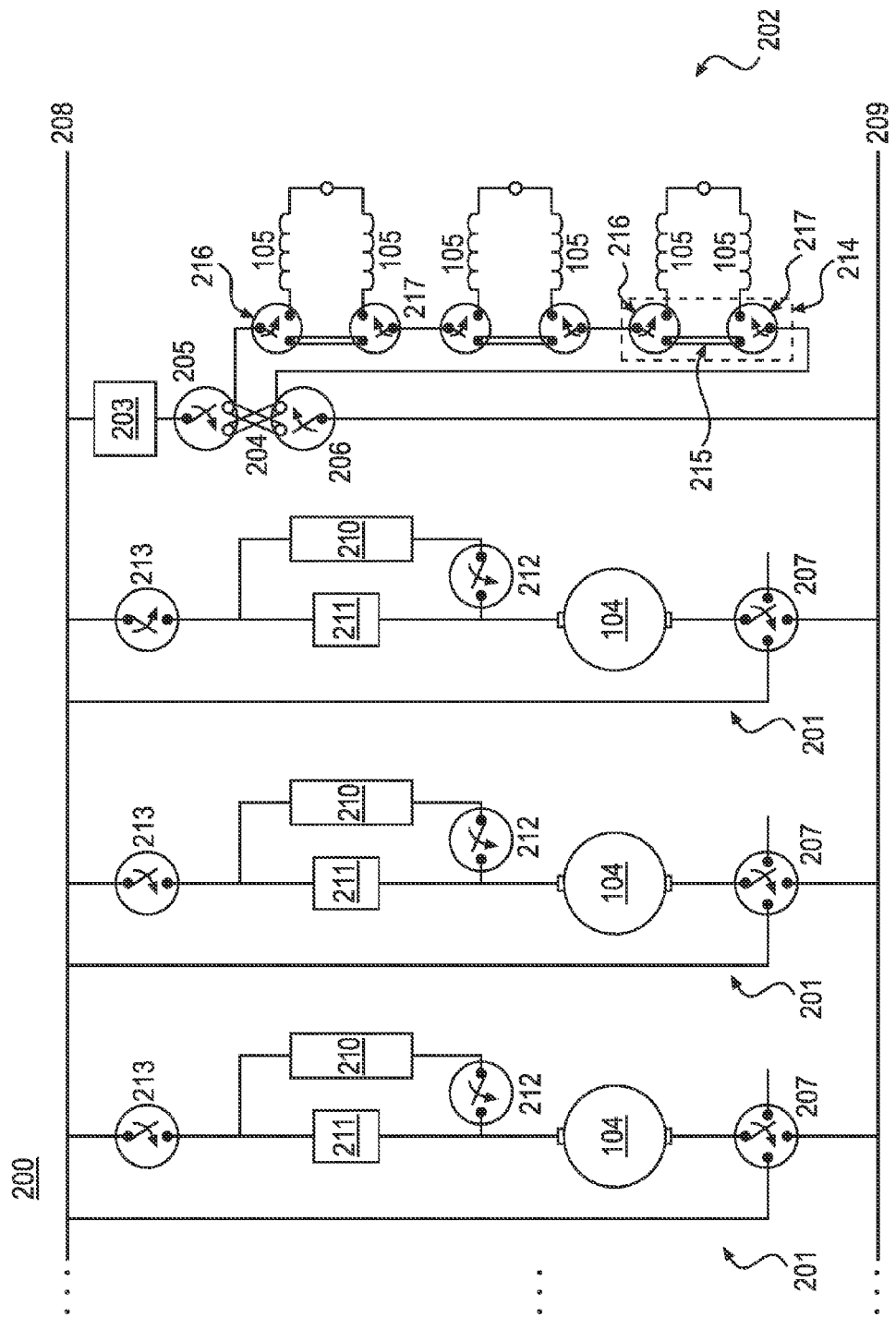
FIG. 2 provides a schematic of an exemplary traction motor drive system including circuitry capable of isolating malfunctioning components.

FIG. 1 illustrates an exemplary locomotive 100 in which systems and methods for traction motor isolation may be implemented consistent with the disclosed embodiments. Locomotive 100 may be any electrically powered rail vehicle employing DC traction motors for propulsion. Furthermore, any electrically powered vehicle employing DC traction motors for propulsion could also incorporate the systems and methods for traction motor isolation consistent with the disclosed embodiments. According to the exemplary embodiment illustrated in FIG. 1, locomotive 100 may include six pairs of wheels 101, with each pair of wheels 101 attached to an axle 102 that is rotatably coupled to a traction motor 103. Traction motors 103 may each include an armature 104 and a field circuit 105. FIG. 2 illustrates the relationship between armature 104 and field circuit 105 within a traction motor drive system 200.

Traction motor drive system 200 includes a plurality of mechanical and electrical components that cooperate to propel locomotive 100. Traction motor drive system 200 may be divided into two distinct but cooperative subsystems, a plurality of armature subsystems 201 and a field winding subsystem 202. As shown in FIG. 2, traction motor drive system 200 comprises a single field winding subsystem 202, which includes field circuits 105 for each traction motor 103 of traction motor drive system 200. Each traction motor 103 has a separate armature subsystem 201.

Field winding subsystem 202 may be connected in parallel with the plurality of armature subsystems 201. Within field winding subsystem 202, each field circuit 105 may be connected in series with one another. In the exemplary embodiment, there are six armature subsystems 201, each corresponding to one of six traction motors 103. For clarity, FIG. 2 shows only three of the six armature subsystems 201. Three additional armature subsystems 201 may be connected in parallel to armature subsystems 201 shown in FIG. 2. Of course, this embodiment may be altered to accommodate a different number of traction motors 103 by changing the number of armature subsystems 201 and the number of field circuits 105 within field winding subsystem 202.

In addition to field circuits 105, field winding subsystem 202 may also include components necessary to operate field circuits 105 during normal operation. For example, field winding subsystem 202 may also include a chopper 203, a reverser 204, and a pair of field polarity switches 205, 206. Chopper 203 may be serially connected to the plurality of field circuits 105.

Chopper 203 may embody a power-regulation device configured to regulate current through field circuits 105. By controlling the current through field circuits 105, chopper 203 may be configured to regulate the torque of traction motors 103. By way of example, when locomotive 100 begins to pull a load, it is the nature of traction motors 103 to require high amounts of current at low generator voltage to provide the torque needed to initially move locomotive 100 and its load. As locomotive 100 accelerates, the requirement for current reduces while the applied voltage increases. Copper 203 responds to this demand.

Traction motor drive system 200 may comprise field polarity switches 205, 206 and reverser 204. By manipulating the direction of current flow through the field windings using field polarity switches 205, 206 and reverser 204, traction motor drive system 200 can control the direction of rotation of traction motors 103, allowing locomotive 100 to travel in both the forward and reverse directions.

Reverser 204 is configured to act as a connection point to the series of field circuits 105. The pair of field polarity switches 205, 206 is configured to switch between the different connection points of reverser 204. The first field polarity switch 205 may be connected to chopper 203 and second field polarity switch 206 may be connected to a second traction bus 209. Field polarity switches 206, 207 may be configured to change the polarity of field circuits 105.

Reverser 204 may be connected to the series of field circuits 105. Reverser 204 has four leads. The first pair of leads connects directly to the series of field circuits 105. The second pair of leads is a set of connection points that field polarity switches 205, 206 can engage. When the directions of field polarity switches 205, 206 are switched, the switches connect to different leads of reverser 204, which effectively reconfigures field winding subsystem 202, reversing the direction of the current flow through field winding subsystem 202 and its field circuits 105.

Field polarity switches 205, 206 of the exemplary embodiment are single-pole, double-throw switches. In a first position, field polarity switches 205, 206 connect directly to the first pair of connection points of reverser 204. In this mode, field polarity switches 205, 206 allow current to flow directly through the series of field circuits 105. In a second position, field polarity switches 205, 206 connect to the second pair of connection points of reverser 204. In this mode, the current must flow through reverser 204 before flowing through field circuits 105 in the opposite direction that it flows when field polarity switches 205, 206 are in the first position.

As shown in FIG. 2, each armature subsystem 201 may include armature 104, a motor-brake switch 207, and other components necessary for dynamic braking, such as a grid resistor 210 and a dynamic braking control circuit 211. Armature subsystem 201 may include the components necessary to operate armature 104 during both powering mode and braking mode. Within each armature subsystem 201, armature 104 is connected between first traction bus 208 and second traction bus 209. During normal powering mode, motor-brake switch 207 may connect the second lead of armature 104 to second traction bus 209. The first lead of armature 104 may connect to first traction bus 208 through the braking components.

Dynamic braking resistors, like grid resistors 210, are well known in the art, and they are only used if the traction motor drive system 200 is configured to perform rheostatic dynamic braking. Grid resistors 210 may not be necessary to implement regenerative dynamic braking. During dynamic braking, traction motors 103 operate as generators when slowing locomotive 100, generally by converting the kinetic energy of wheels 101 into electrical energy. A plurality of grid resistors 210, each arranged in series with one of the armatures 104, may be used to dissipate the generated electrical power as heat. Any method or device known in the art that is capable of dissipating or using the power generated by traction motors 103 during braking can be used in place of grid resistors 210 and dynamic braking control circuit 211.

A brake switch 212 is used in conjunction with motor-brake switch 207 to switch traction motor drive system 200 from powering mode into braking mode. Traction motor drive system 200 may include a plurality of brake switches 212, each connected between one of armatures 104 and one of grid resistors 210. During the powering mode, brake switch 212 remains open, electrically isolating grid resistor 210. During the braking mode, brake switch 212 closes, providing an electrical connection between traction armature 104 and grid resistors 210 to allow grid resistors 210 to dissipate the excess power produced during dynamic braking. Brake switch 212 can be any switch or contactor capable of performing this function. In one exemplary embodiment, brake switch 212 is a single-pole, double-throw switch. Brake switch 212 can be controlled manually by an operator command, or it can change automatically when motor-brake switch 207 is moved into a brake position.

Traction motor drive system 200 may be capable of isolating at least one armature subsystem 201 in which one or more components is malfunctioning. Armature isolation may be realized by the selective operation of a power switch 213 and motor-brake switch 207 connected to armature 104. Each of the plurality of armatures 104 comprises a first armature terminal and a second armature terminal. The first armature terminal is selectively coupled to a first traction bus 208 via power switch 213. The second armature terminal is coupled to motor-brake switch 207, which includes at least a first and second switch position. The first switch position may be configured to electrically couple the second armature terminal to second traction bus 209, and the second switch position may be configured to decouple the second armature terminal from second traction bus 209.

Motor-brake switch 207 may be a single-pole, triple-throw switch that is able to isolate armature 104 from the remainder of traction motor drive system 200 in the event of an electrical failure affecting all or part of armature subsystem 201. According to an exemplary embodiment, motor-brake switch 207 may have at least three modes of operation: a powering mode, an isolation mode, and a braking mode. During the powering mode, motor-brake switch 207 connects the second lead of armature 104 to second traction bus 209. To isolate armature subsystem 201, motor-brake switch 207 shifts into a second mode that electrically disconnects the second lead of armature 104 from any power source. This, in cooperation with the operation of power switch 213, electrically isolates armature 104 from the remainder of traction motor drive system 200. In the third position, motor-brake switch 207 may electrically couple the second armature terminal to first traction bus 208 to shift armature 104 into braking mode.

In one embodiment, motor-brake switch 207 may be configured to isolate armature 104 automatically in the event of an electrical failure affecting all or part of armature subsystem 201. In another embodiment, motor-brake switch 207 may be configured to isolate armature 104 only after receiving a command from an operator or another system of locomotive 100 to isolate armature 104. There are a variety of other switches and contactors known in the art that are capable of disconnecting armature 104 that are equally suitable to operate as motor-brake switch 207 of the traction motor drive system 200. Motor-brake switch 207 may include or embody any of these types of components.

Power switch 213 may be a single-pole, single-throw switch that is able to isolate armature subsystem 201 from the remainder of the traction motor drive system 200 by disconnecting the armature subsystem 201 from first traction bus 208. In one embodiment, power switch 213 may operate to isolate armature 104 automatically in the event of an electrical failure affecting all or part of armature subsystem 201. Alternatively, power switch 213 could operate to isolate armature 104 only after receiving a command from an operator or another system of the locomotive 100 to isolate armature 104. There are a variety of other switches and contactors known in the art that are capable of disconnecting armature 104 that are equally suitable for operating as power switch 213 of traction motor drive system 200. Power switch 213 may include or embody any of these types of components.

In the exemplary circuit of FIG. 2, motor-brake switch 207 and power switch 213 are configured to isolate armature subsystem 201, including armature 104, grid resistor 210, and dynamic braking control circuit 211, from the remainder of traction motor drive system 200. Alternatively, motor-brake switch 207 could be a single-pole, double-throw switch capable only of switching between braking mode and powering mode. In this configuration, to achieve armature isolation, a dedicated isolation switch (not shown) could be incorporated to achieve the same result.

While not shown in FIG. 2, alternative configurations of traction motor drive system 200 may include fewer power switches 213 and motor-brake switches 207, such that each power switch 213 and motor-brake switch 207 controls the current flow to multiple armature subsystems 201. It is not necessary that each armature subsystem 201 have a devoted power switch 213 and motor-brake switch 207. For example, pairs of armature subsystems 201 could share a common power switch 213 and a common motor-brake switch 207. Other configurations of armature isolation components can be contemplated by one with ordinary skill in the art.

In addition to armature isolation, traction motor drive system 200 may be configured to isolate defective or malfunctioning field circuits 105 using a field isolation system 214 associated with field winding subsystem 202. Field isolation system 214 comprises a shunt circuit 215, a first field switch 216, and a second field switch 217. Traction motor drive system 200 may include a plurality of field isolation systems 214, each field isolation system 214 associated with a respective one of the field circuits 105. Also, the plurality of field isolation systems 214 may be associated with a respective pair of field circuits 105. In FIG. 2, traction motor drive system 200 contains three field isolation systems 214, each corresponding with a pair of field circuits 105.

Within field winding subsystem 202, field circuits 105 are connected in series with first field switch 216 and second field switch 217, which can remove a defective field circuit 105 from traction motor drive system 200. By shunting a defective field circuit 105, the remaining field circuits 105 of traction motor drive system 200 continue to receive power and operate normally. The embodiment illustrated in FIG. 2 allows traction motor drive system 200 to achieve 4/6 of normal tractive or braking effort despite a malfunctioning field circuit 105. When first field switch 216 and second field switch 217 engage to isolate a pair of field circuits 105, first field switch 216 connects to the first end of shunt circuit 215, and second field switch 217 connects to the second end of shunt circuit 215. In this configuration, field circuits 105 are shunted, such that the current continues to flow through the remainder of field winding subsystem 202.

Field switches 216, 217 can be any electromechanical component capable of isolating field circuit 105 from the remainder of traction motor drive system 200 in the event of an electrical failure affecting all or part of field circuit 105. In one embodiment, field switches 216, 217 may be single-pole, double-throw switches. There are a variety of other switches and contactors known in the art that are capable of isolating field circuit 105 from the remainder of traction motor drive system 200. Field switches 216, 217 may include or embody any of these types of components.

The operation of field switches 216, 217 may be automatic or manual. In one embodiment, field switches 216, 217 could operate to shunt one or more of the field circuits 105 automatically in the event of an electrical failure affecting all or part of a malfunctioning field circuit 105. Alternatively, field switches 216, 217 could operate to shunt field circuit 105 only after receiving a command from an operator to isolate field circuit 105 from the remainder of traction motor drive system 200. In yet another embodiment, the operation of field switches 216, 217 could result from a combination of automatic or manual inputs. For example, first field switch 216 may operate to shunt field circuit 105 only after receiving a command to do so, and second field switch 217 may operate automatically once first field switch 216 becomes engaged.

It should be emphasized that power switch 213 and motor-brake switch 207, as well as first and second field switches 216, 217, can be separately controlled such that isolation of armature subsystem 201 does not require isolation of field winding subsystem 202. Likewise, isolation of field winding subsystem 202 does not require isolation of armature subsystem 201.

The schematic in FIG. 2 shows exemplary traction motor drive system 200 capable of isolating both armatures 104 and field circuits 105. It is also contemplated, however, that traction motor drive system 200 may be implemented with one of the isolation capabilities. For example, traction motor drive system 200 may include field circuit isolation capabilities without necessarily requiring an armature isolation system. Alternatively, traction motor drive system 200 may be provided with armature isolation capabilities and without the field isolation capabilities. Thus, the system need not be limited to the specific embodiment of FIG. 2 but may have different configurations of the components described.

It is contemplated that locomotive 100 may include additional components for communication between an operator and traction motor drive system 200. For example, a controller may be a processor capable of receiving inputs from sensors to detect electrical failures. The controller may also be configured to notify the operator of the occurrence of an electrical fault and may allow the operator to send control signals to isolate the affected components. Locomotive 100 may include an operator interface that provides the operator a way to read fault notifications and send commands to the controller. For example, the operator interface may include a processor for receiving notifications from the controller and an output screen for displaying these notifications to the operator. The operator interface may also include an operator input system, like a series of buttons, for the operator to send commands to the controller to selectively isolate electrical components.

FIG. 2 shows a schematic for an exemplary traction motor drive system 200 in which field circuits 105 are grouped in pairs. In the event of a failed field circuit 105, the pair of field circuits 105 that includes the failed field circuit 105 will be shunted by connecting to shunt circuit 215. In another embodiment, field circuit 105 could be individually isolated by adding more field switches 216, 217 and shunt circuits 215 to field winding subsystem 202 such that each field circuit 105 would have two dedicated field switches 216, 217, as well as a dedicated shunt circuit 215. In yet another embodiment, field circuits 105 may be arranged into larger groups. Other embodiments and arrangements are possible and should be apparent to one skilled in the art.

Figure 3:
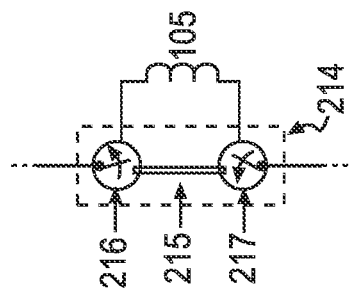
FIG. 3 shows an orientation where each field winding can be individually isolated.
Figure 4:
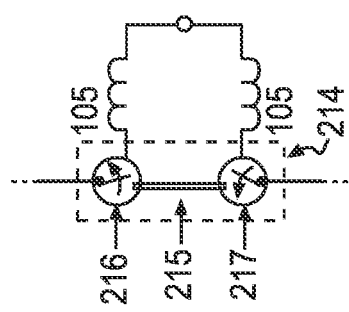
FIG. 4 shows an orientation where field windings are isolated in pairs.
Figure 5:
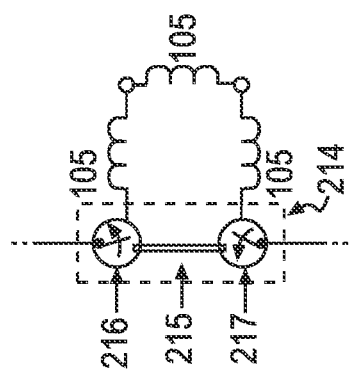
FIG. 5 shows an orientation where field windings are isolated in groups of three.

FIGS. 3-5 show alternative configurations of field circuits 105. FIG. 3 shows a configuration in which each field circuit 105 corresponds with its own field isolation system 214, so that each field circuit 105 can be individually shunted. In this configuration, there will be two field switches 216, 217 and one shunt circuit 215 for each traction motor 103. FIG. 4 shows a configuration of field circuits 105 in pairs, as shown in FIG. 2. In this configuration, every pair of field circuits 105 has a corresponding shunt circuit 215 and a pair of field switches 216, 217. Finally, FIG. 5 shows field circuits 105 arranged in groups of three. In the configuration shown in FIG. 5, each field isolation system 214 is associated with a respective group of three of the field circuits 105. The configurations of field circuits 105 may be customized to suit the particular needs of traction motor drive system 200. Furthermore, traction motor drive system 200 may organize field circuits 105 into groups of varying sizes.

Figure 6:
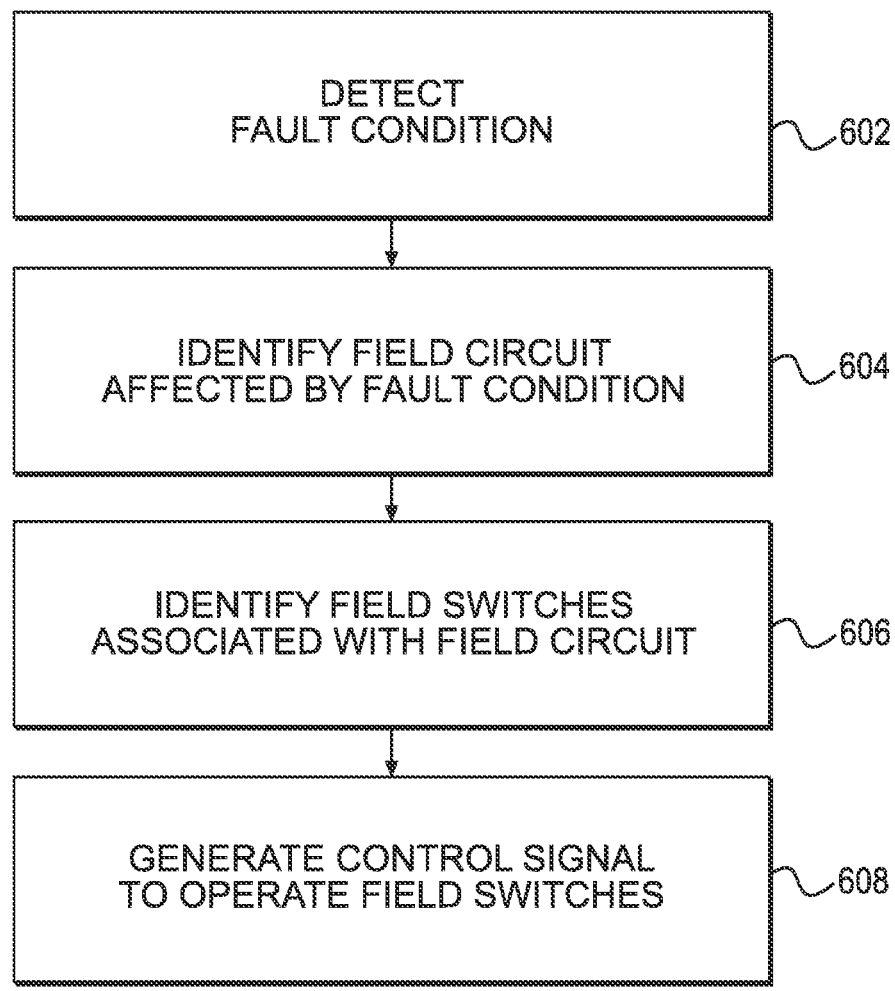
FIG. 6 provides a flowchart depicting an exemplary method for isolating traction motor components in the event of an electrical failure.

FIG. 6 provides a flowchart depicting an exemplary method for selectively isolating traction motor components in the event of an electrical failure. The process commences when a sensor detects an electrical fault condition associated with at least one traction motor 103 of traction motor drive system 200 (Step 602). A sensor (not shown) capable of sensing an electrical change in a circuit may detect the fault condition. For example, a current sensor may detect a sudden surge in current within traction motor drive system 200 that corresponds with an electrical failure (or ground fault leakage current, etc.). The sensor may communicate the electrical failure to a controller (not shown).

Once an electrical failure is detected, the location of the electrical failure may be identified. In an exemplary process that detects an electrical failure affecting field circuit 105, this may include identifying field circuit 105 from among a plurality of series-connected field circuits 105 that correspond to traction motor 103 affected by the fault condition (Step 604). In another embodiment, this may include identifying armature 104 from among a plurality of parallel-connected armatures 104 that corresponds to traction motor 103 affected by the fault condition. The same sensor that identifies an electrical fault may also be used to locate the electrical fault. For example, each armature subsystem 201 and each field circuit 105 may be associated with a current sensor to detect electrical faults. A controller may receive a signal from the sensor indicating the occurrence of the electrical fault. The controller may identify the location of the electrical fault based on which sensor sent the signal.

To isolate the affected components, the controller may identify the switches that correspond to the problematic electrical component (Step 606). If the problematic component is field circuit 105, the controller may identify the associated field switches 216, 217 for isolating field circuit 105 from the remainder of the series-connected field circuits 105. In one embodiment, the sensor may communicate the identity of field switches 216, 217 to the controller when notifying the controller of an electrical failure. Alternatively or additionally, if the problematic electrical component is contained in armature subsystem 201, the controller may identify the associated motor-brake switch 207 and power switch 213 for isolating problematic armature subsystem 201 from the remainder of armature subsystems 201. Once the switches that are capable of isolating the affected electrical component are identified, the controller may initiate the component isolation.

To isolate affected field circuit 105, the controller may generate a control signal to operate field switches (Step 608). The control signal may be configured to cause first field switch 216 arranged in series with the plurality of series-connected field circuits 105 to switch from a first field terminal of the affected field circuit 105 to a first shunt terminal of a shunt circuit 215 associated with field circuit 105. The control signal may also be configured to cause second field switch 217 arranged in series with the plurality of series-connected field circuits 105 to switch from a second field terminal of the affected field circuit 105 to a second shunt terminal of shunt circuit 215 associated with field circuit 105.

The controller may generate a second control signal to operate motor-brake switch 207 associated with the identified affected armature 104. The second control signal may be configured to isolate armature 104 from traction motor drive system 200. Motor-brake switch 207 may be a single-pole, triple-throw switch having three switch position settings: a powering mode, a braking mode, and an isolation mode. The second control signal may include a command to select the isolation position setting from among the three position settings of motor-brake switch 207. To isolate affected armature subsystem 201, the process may also include generating a third control signal for operating power switch 213 associated with the identified armature 104 to electrically disconnect the identified armature 104 from power.

The third control signal may include a command to open power switch 213, which will disconnect armature subsystem 201 from first traction bus 208. Upon receiving the third control signal, power switch 213 would open, electrically disconnecting armature subsystem 201 from first traction bus 208. In this manner, power switch 213 and motor-brake switch 207 electrically isolate affected armature subsystem 210 from traction motor drive system 200, so that no current flows to affected armature 104. Power switch 213 may be a single-pole, double-throw switch.

In one embodiment, the controller may generate a signal for notifying an operator of the fault condition. The notification may provide information to the operator identifying the components affected by the fault condition. The controller may also receive a command signal from the operator requesting isolation of the fault circuit. In one embodiment, the operator is also the locomotive operator.

INDUSTRIAL APPLICABILITY

The disclosed systems and methods for traction motor isolation described herein provide a robust solution for enhancing the performance of traction motor drive systems by allowing them to maintain maximum functionality in the event of an electrical failure affecting one or more of its components. By isolating only portions of the affected traction motor, the traction motor drive system preserves the functionality of the remaining portions of the affected traction motor for use in powering or braking. This has the additional benefit of allowing dynamic braking even if some of the electrical components are inactive.

The presently disclosed traction motor drive system may have several advantages. Specifically, by limiting isolation to only those individual armatures or field circuits that have failed, the presently disclosed isolation system may aid in maintaining maximum operational capabilities of the system. This is particularly advantageous when the locomotive is not close to a repair station.

It will be apparent to those skilled in the art that various modifications and variations can be made to the disclosed systems and associated methods for traction motor isolation of an electrically powered rail vehicle. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for selectively isolating fault conditions on a traction motor drive system, the method comprising:
   detecting a fault condition associated with at least one of a plurality of traction motors of the traction motor system;
   identifying a field circuit from among a plurality of series-connected field circuits that corresponds to the at least one traction motor affected by the fault condition;
   identifying a plurality of field switches for isolating the field circuit from the remainder of the series-connected field circuits;
   generating a control signal for operating the identified plurality of field switches, the control signal configured to:
      cause a first field switch arranged in series with the plurality of series-connected field circuits to switch from a first field terminal of the identified field circuit to a first shunt terminal of a shunt circuit associated with the field circuit; and
      cause a second field switch arranged in series with the plurality of field circuits to switch from a second field terminal of the identified field circuit to a second shunt terminal of the shunt circuit.

2. The method of claim 1, further comprising:
   generating a signal for notifying an operator of the fault condition; and
   receiving a command signal from the operator requesting isolation of the fault condition.

3. The method of claim 1, further comprising:
   identifying an armature from among a plurality of parallel-connected armatures that corresponds to the at least one traction motor affected by the fault condition; and
   generating a second control signal for operating a motor-brake switch associated with the identified armature, the second control signal configured to isolate the armature from the traction motor system.

4. The method of claim 3, wherein the motor-brake switch comprises a single-pole, triple-throw switch having three switch position settings, wherein generating the second control signal includes generating an isolation position selection signal that is configured to select an isolation position setting from among the three position settings of the motor-brake switch.

5. The method of claim 3, further comprising generating a third control signal for operating a power switch associated with the identified armature to electrically disconnect the armature from power.

* * * * *